US005544037A

United States Patent [19]

Luger

[11] Patent Number: 5,544,037

[45] Date of Patent: Aug. 6, 1996

[54] CONTROL ARRANGEMENT FOR CONSUMER UNITS WHICH ARE ALLOCATED TO GROUPS

[75] Inventor: Siegfried Luger, Dornbirn, Austria

[73] Assignee: Tridonic Bauelemente GmbH, Dornbirn, Austria

[21] Appl. No.: 281,008

[22] Filed: Jul. 27, 1994

[30] Foreign Application Priority Data

Aug. 18, 1993 [DE] Germany .......................... 43 27 809.4

[51] Int. Cl.[6] .......................... H05B 39/04; H02J 13/00

[52] U.S. Cl. .......................... 364/146; 340/825.52; 315/291

[58] Field of Search .......................... 364/130, 131, 364/132, 188, 135–147, 492, 493, 505, 189; 340/825, 825.07, 825.52, 825.53, 310.01, 310.06, 534; 315/294, 295, 312–315, 291; 307/38, 40; 395/275

[56] References Cited

U.S. PATENT DOCUMENTS

| | | | |
|---|---|---|---|
| 4,751,498 | 6/1988 | Shalvi et al. | 340/534 |
| 5,059,871 | 10/1991 | Pearlman et al. | 315/316 |
| 5,128,594 | 7/1992 | Watanabe et al. | 315/294 |
| 5,160,924 | 11/1992 | Jean-Pierre et al. | 340/825 |
| 5,191,265 | 9/1993 | D'Aleo et al. | 315/295 |
| 5,233,346 | 8/1993 | Minerd et al. | 340/825.52 |
| 5,274,767 | 12/1993 | Maskovyak | 395/275 |
| 5,352,957 | 10/1994 | Werner | 315/291 |

FOREIGN PATENT DOCUMENTS

| | | |
|---|---|---|
| 2032426 | 6/1991 | Canada . |
| 0433527A1 | 6/1991 | European Pat. Off. . |
| 0435224 | 7/1991 | European Pat. Off. . |
| 0444635 | 9/1991 | European Pat. Off. . |
| 0361993 | 2/1993 | European Pat. Off. . |
| WOA-93-02498 | 2/1993 | WIPO . |

*Primary Examiner*—Roy N. Envall, Jr.
*Assistant Examiner*—Steven R. Garland
*Attorney, Agent, or Firm*—Fitzpatrick, Cella, Harper & Scinto

[57] ABSTRACT

There is disclosed a control arrangement for plural consumer units allocated to groups for operation by means of operating elements connected with at least one group address control transmitter. The transmitter transmits group addresses to control receivers which are connected to customer units and in which group addresses are stored during a commissioning phase, whereby after such commissioning, consumer units are connected in groups with associated control receivers according to the operation of an operating element.

20 Claims, 3 Drawing Sheets

CONTROL ARRANGEMENT FOR CONSUMER UNITS WHICH ARE ALLOCATED TO GROUPS

BACKGROUND OF THE INVENTION

1. Field of the Invention

The invention relates to a control arrangement for a plurality of consumer units which are allocated to groups, in particular for lighting bodies which can be operated as a group by means of an operating element. Further, the invention relates to a method for controlling the consumer units allocated to groups.

2. Description of the Related Art

As a rule, many lighting bodies are present in larger rooms and buildings and individual groups of these lighting bodies, e.g. individual rows of an arrangement of ceiling lights, are to be turned on or turned off by one operating element, e.g. a simple switch. In the simplest case, this can be achieved in that, from a first operating element, a supply line is laid to which all lighting bodies are connected which are to be operated by the first operating element. In the same manner, the further operating elements and the respectively associated lighting bodies are connected. However, this procedure necessitates the laying of many supply lines and, moreover, has the disadvantage that a once-selected, fixed wired allocation of the lighting bodies to an operating element can only be altered with great effort.

This disadvantage is overcome in principle by the control system described in the assignee's European Patent Application EP-90 100 465. In accordance with this known control system, a control receiver is connected upstream of each consumer unit. Further, the known control system has a commander to which the operating elements are connected and a control line for transmitting control commands from the commander to the control receivers, and, possibly; also for transmitting control signals in the reverse direction. All control receivers are connected to the commander via a common control line and a supply line, so that the wiring of the control receivers and the associated consumer units is configured extremely simply. However, the association of the individual consumer units to a superior consumer unit group is achieved by means of a relatively time consuming and complicated programming procedure. In substance, the programming procedure is based on the fact that a production number (original address) which is already stored in the control receiver on production thereof, and which indicates the characteristics of the connected consumer unit, is replaced by an operational address, which may indicate e.g. the room number, the group number and the individual consumer unit number.

For commissioning the known control system a commissioning program must be set running for initialising the consumer units, which program requires prior programming by specialists. As described, the central commander recognizes the configuration of the consumer unit connected to the control receiver from the production number (original address) transmitted from the control receiver to the commander. If the production number is incorrect, e.g. as a consequence of a long period of storage of the lighting body between production and installation, this leads necessarily to errors in the operation of the control system. Along with the necessary programming by specialists, this represents a significant disadvantage of the known control system.

SUMMARY OF THE INVENTION

It is therefore the object of the present invention to provide a process for the control of consumer units allocated to groups and a corresponding arrangement which can be put into operation without profound specialist knowledge and which does not require the storage of a consumer unit specific production number or the like.

With regard to the process, this object is achieved in that during a commissioning phase, for determining the allocation of the consumer units to the groups, the consumer units of a first consumer unit group are respectively connected with first control receivers, a first group address, which indicates the allocation of the first consumer unit group to a first operating element is stored in the first control receivers as a result of an operation of the first operating element, the consumer units of a second consumer unit group are respectively connected with second control receivers, a second group address, which indicates the allocation of the second consumer unit group to a second operating element, is stored in the second control receivers, a second group address, which indicates the allocation of the second consumer unit group to a second operating element, is stored in the second control receivers as a result of an operation of the second operating element whilst the first group address stored in the first control receivers is retained. In regard to any further consumer unit groups, similar procedures may be carried in succesion, group by group, until all consumer units are connected with associated control receivers. During an operational phase, as a result of an operation of a particular operating element a group address, which indicates the operated operating element, is transmitted to all control receivers, and the control of a consumer unit connected to a control receiver is effected only when the group address stored in the respective control receiver corresponds with the transmitted group address.

The inventive concept is thus based on the insight that the commissioning of a control arrangement can be achieved in a simple manner in that initially a first group of consumer units with associated control receivers is connected and then a first operating element, which is to be associated with this first consumer unit group, is operated, whereupon a group address corresponding to the first operating element is stored into the control receivers of the first consumer unit group. Subsequently, a second group of consumer units is connected with second control receivers and a second operating element, which is to be associated with the second consumer unit group, is operated. Through the operation of the second operating element, a second group address is stored in the second control receivers. In contrast, the first group address continues to be stored in the first control receivers and is not over-written by the second group address. Subsequently, the same procedure is followed for any further consumer unit groups present, until all consumer units are connected with associated control receivers and the installation of the consumer units is thus concluded. In the course of operation of the control arrangement, in response to the operation of a particular operating element a group address is transmitted to all control receivers, which group address indicates the operation of a particular operating element. Each control receiver carries out a comparison operation and compares the received group address with the group address stored in the commissioning phase. Control of the connected consumer unit occurs only when the transmitted and the stored group addresses agree.

Further advantageous features of the invention involve the transmission to the control receivers, of a function address, along with a group address. The function address selects a particular function from amongst a plurality of functions of a consumer unit. In addition, a plurality of function addresses are stored in each control receiver along with the group address. These function addresses represent the functions of the consumer unit connected to the control receiver, whereby when the received function address agrees with a stored function address, the connected consumer unit is placed in the corresponding functional condition.

Accordingly, a function address can be transmitted along with the group address, which function address indicates a particular one of several possible functions of the connected consumer unit. The possible functions of a connected consumer unit can be detected by the control receiver at the time of connection of the consumer unit, e.g. through measurement of corresponding characteristic parameters. Further, it is advantageous if the allocation of the consumer units to groups is alterable during the operational phase, corresponding to claim 5, without the need to undertake a new installation of the consumer units. In order to be able to undertake a repeated installation of the consumer units, possibly with altered group allocations, it is advantageous if the group addresses and possible also functions addresses stored in the control receivers are erased after separation of the connection between consumer unit and control receiver.

With regard to an arrangement for carrying out the process according to the invention, the object is achieved by the provision of a control arrangement for controlling consumer units allocated to groups wherein the control arrangement comprises a plurality of operating elements, each for controlling a consumer unit group to be associated therewith, and at least one control transmitter, whereby each operating element is connected with the control transmitter or with one of a plurality of control transmitters and sends signals thereto, which signals correspond to the operating function associated with the operating element or corresponding to one of a plurality of operating functions associated with the operating element. There is also provided a plurality of control receivers to which consumer units, in particular lighting bodies, can be connected, which control receivers each have a memory for storing group and/or function addresses, a connection test device for determining whether a consumer unit is connected to the control receiver, and a control circuit for controlling the connected consumer unit. There is also provided a control line which connects the control transmitter or control transmitters with the control receivers for the transmission of the group and/or function addresses.

The invention further involves other advantageous features. For example, a control transmitter common to all operating elements may be provided which by means of corresponding in and/or output devices can also serve for central control of the arrangement. It is, however, also possible, to associate with each individual operating element a simply constructed decentral control transmitter.

In the control receivers, the storage of the operating addresses and possibly also the function addresses can advantageously take place in an erasable non-volatile memory. The control line can be formed either as an electrical line or, as an optical conductor. It is, however, also conceivable to employ the supply line simultaneously as control line. The connection test device of the control receiver can test for the presence and possibly also the configuration of a connected consumer unit, by mechanical or by electrical means. The control circuit of the control receiver, which controls the consumer units, can have, alongside a controllable switch, also a power regulating part.

BRIEF DESCRIPTION OF THE DRAWINGS

Embodiments of the invention are illustrated by way of example in the drawings, which show.

DETAILED DESCRIPTION OF THE PREFERRED EMBODIMENTS

Figure 1:
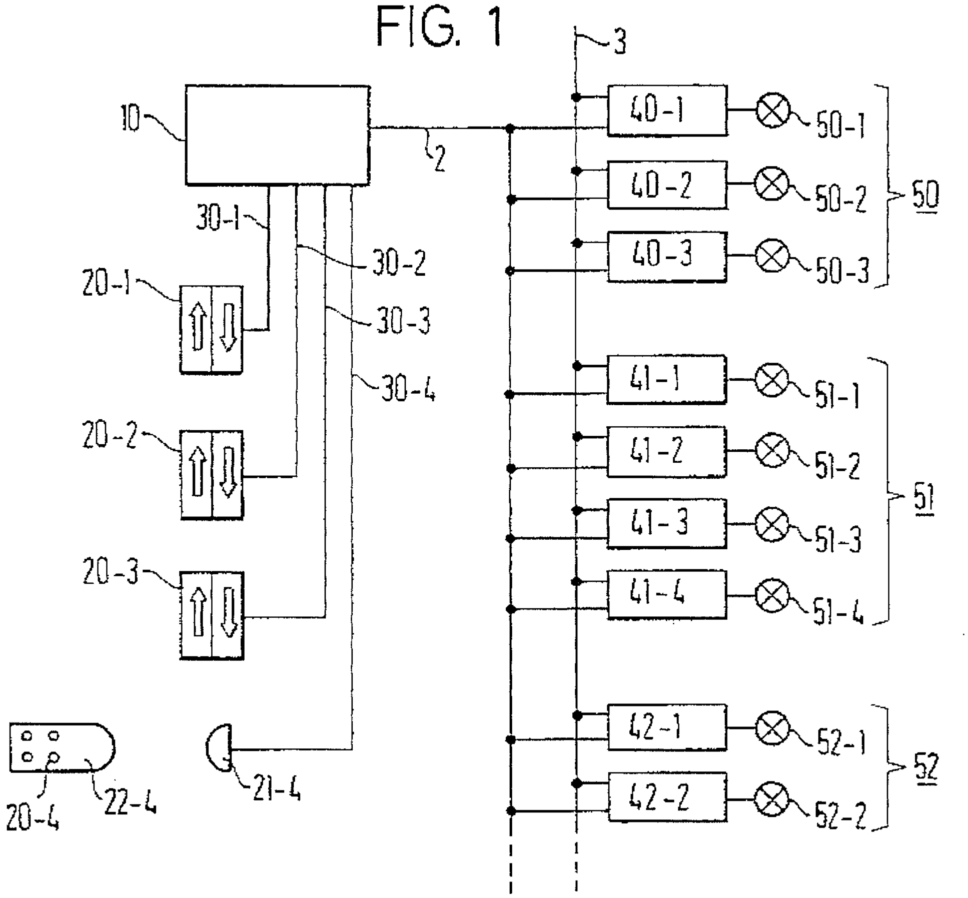
FIG. 1 a first exemplary embodiment of the control arrangement according to the invention.

Initially, a first exemplary embodiment of the control arrangement in accordance with the invention is to be described with reference to FIG. 1. A series of operating elements 20-1 to 20-4 is connected to a control transmitter 10 via connecting lines 30-1 to 30-4. It is, however, also possible to connect the operating elements with the control transmitter 10 in a "wireless" manner, as illustrated in the case of the operating element 20-4. The operating element 20-4 is, for this purpose, arranged with a remote control transmitter 22-4 which emits a remote control signal, e.g. an infra-red signal, which is received by a sensor unit 21-4. The signal received at the sensor unit 21-4 is then passed on to the control transmitter 10 via the connecting cable 30-4. The operating elements may be e.g. simple switches for switching on or switching off the associated consumer unit group. There may, however, be several switch elements available in order to purposefully control several functions of an addressed consumer unit group, e.g. to control different brightness levels of a lighting body, or the direction of rotation and the speed of rotation of a motor. Furthermore, the operating element may be a step-less regulating element, e.g. a rotatable regulator, in order to control in a step-less fashion a particular characteristic of the consumer unit, e.g. the intensity of a lighting body.

In dependence upon which of the various operating elements 20-1 to 20-4 is operated, the control transmitter 10 generates a group address, whose coding is uniquely associated with a particular operating element. If several different functions of a particular consumer unit group are to be controlled, the control transmitter generates along with the group address also a function address which characterises a particular one of the several functional states of the consumer unit group.

The group address and, if applicable, the function address is or are passed to control receivers 40-1 to 40-3; 41-1 to 41-4 and 42-1 to 42-2 via a control line 2. The transfer can be effected by means of a known data transfer procedure. The control receivers are further connected with a supply line 3. As a variant, it is conceivable that the control line 2 and the supply line 3 are provided as a common line which connects all the control receivers with the control transmitter. The transfer of group addresses and function addresses is then to be affected by means of a known modulation procedure on the supply line, e.g. in such a manner that the frequency of the data modulation procedure employed differs significantly from the mains frequency of the supply line. Further, it is also conceivable to employ optical transmission lines, in particular glass fibre conductors, to provide the control line, instead of electrical conductors. The control receivers 40-1 to 42-2 control the power consumption of the connected consumer units 50-1 to 52-2 in dependence upon the received group addresses and/or function addresses. The control process will be explained below. The consumer units 50-1 to 50-3 or 51-1 to 51-4 or 52-1 to 52-2 are associated with different groups 50 or 51 or 52. The number of consumer units which are allocated to a group may be variable. In particular, a consumer unit group may consist of solely a single consumer unit.

Figure 2:
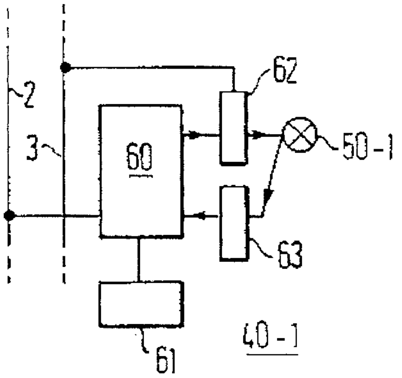
FIG. 2 a detailed representation of a control receiver of the control arrangement according to the invention.

With reference to FIG. 2, the uniform construction of the control receivers 40-1 to 42-2 will be explained in more detail. A control unit 60 is connected to the control line 2. Further, the control receiver has available a memory 61 for storing the group address, and, if applicable, also the function address. For controlling the consumer unit 50-1, the control receiver also has a control circuit 62 which is connected with the supply line 3 with the supply voltage terminals of the associated consumer unit 50-1 and with the control unit 60. Furthermore, a connection test device 63 is present, which device determines whether a consumer unit 50-1 is connected to the control circuit and transmits a corresponding signal to the control unit 60.

In the simplest case, the control circuit 62 may be a controllable switch such as a relay or a triac. For step-less or stepped regulation of the power take-up of the connected consumer unit, e.g. the variation of the brightness of a lighting body or of the speed of an electric motor, a power regulating switch, e.g. a dimmer, should however be used as the control circuit. If a consumer unit has several independently controllable supply terminals, several control circuits 62 should be correspondingly provided.

The connection test device 63 tests whether the consumer unit 50-1 is connected to the control circuit 62 at a particular point in time. This can be effected e.g. by means of a mechanical button (switch) at the normal installation location of the consumer unit, e.g. at the installation mounting of a lighting body. Similarly, it is possible to check by mechanical means whether a connection plug has been inserted into a socket arrangement provided therefor, so that a connection is created between the control circuit and the consumer unit. It is, however, also possible to determine by means of electrical measurements, in particular impedance measurements, whether a corresponding consumer unit is connected to the terminals of the control circuit. By measurement of the impedance of the connected consumer unit and, if applicable, of further electrical parameters, it can be determined which of several possible consumer units is connected to the control circuit.

Figure 3:
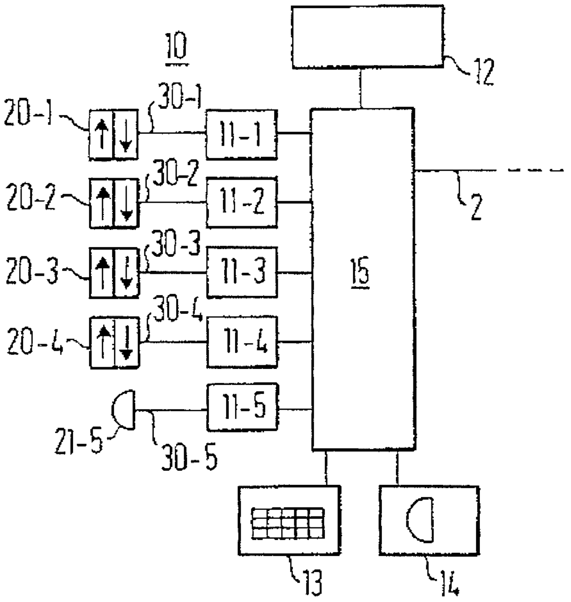
FIG. 3 a detailed representation of a control transmitter of the control arrangement according to the invention.

With reference to FIG. 3, the construction of the control transmitter 10 will be described in more detail. The operating elements 20-1 to 20-4 and the sensor element 21-5 are connected to the control unit 15 by way of several input circuits 11-1 to 11-5 which carry out a buffer and signal translation function. Further, the control transmitter 10 has available a memory 12 for intermediate storage of operating functions which have already been selected by means of the operating elements 20-1 to 20-5 but whose corresponding group addresses or function addresses have not yet been transferred. Moreover, the grouping of the consumer units determined during the commissioning of the control system can also be stored in the memory 12. The operating condition of the control arrangement, the functional conditions of the connected consumer units and further useful data can be displayed to an operating person by means of a display device 14. Furthermore, an input device 13, e.g. a keyboard, may be present with which an operating person can directly control the operating functions which can be selected by means of the operating elements 20-1 to 20-4. The control transmitter 10 can therefore be arranged e.g. in the control centre of a building complex, and all electrical consumer units of the building, in particular all lighting arrangements can be centrally controlled from this control centre.

In dependence upon the operation of an operating element, the control unit 15 generates a group address and/or function address which, as described, must be associated in a unique manner with the operated operating element or the selected operating function.

Figure 4A:
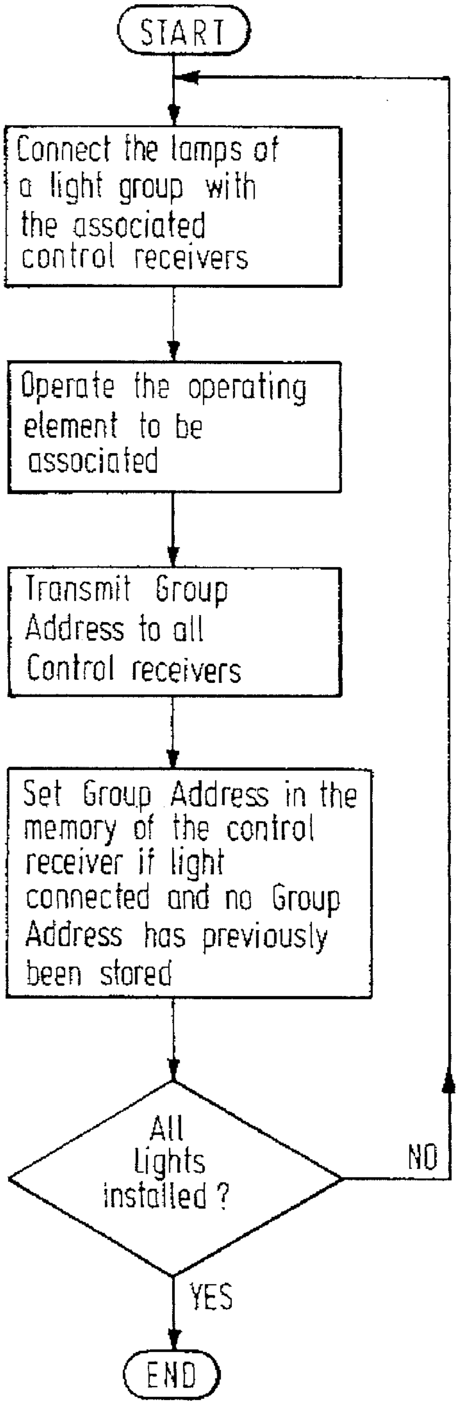
FIG. 4A a flow diagram for explanation of the process according to the invention during the commissioning phase.

In the following, the process in accordance with the invention for commissioning the control arrangement in accordance with the invention will be explained with reference to FIG. 4A. Here, the consumer units are any desired lamps. There are arranged in the housing of a light inter alia a lamp operating apparatus (e.g. an electronic ballast) and a lamp placed in a lamp holder. In the first process step, the lamps of a first lighting group (50-1 to 50-3 in FIG. 1) are inserted in the associated holders, i.e. electrically connected with the associated control receivers (40-1 to 40-3 in FIG. 1). Thereafter, that operating element (e.g. 20-1 in FIG. 1) is operated which is to be associated with the first lighting group in the later operational phase. Via the control line 2, the control transmitter 10 then sends to all control receivers 40-1 to 42-2 a group address which corresponds to the selected operating element (e.g. 20-1). The received group address is then stored by the control receivers 40-1 to 42-2 when, during the commissioning phase, no group address has previously been stored and when a lamp is placed in the lamp holder of a light associated with a control receiver and is thereby connected electrically with the relevant control receiver. During this first installation cycle, this is the case for the control receivers 40-1 to 40-3.

Thereafter, this procedure is repeated in cycles for all light groups. Thus, in the next cycle the lights 51-1 to 51-4 are connected with the control receivers 41-1 to 41-4. That operating element which is to be associated with the second lighting group is operated and the control transmitter 10 sends to all control receivers 41-1 to 42-2 a group address corresponding to the operating element (e.g. 20-2). The group address is, however, stored only by those control receivers at which a light is installed (this is the case for the control receivers 40-1 to 40-3 and 41-1 to 41-4) and which have not yet stored a group address during the commissioning phase. Thus, the group address stored in the control receivers 40-1 to 40-3 in the first installation cycle is not over-written in the second installation cycle and the group address is stored in the second installation cycle solely by the control receivers 41-1 to 41-4.

There follow as many installation cycles as are necessary to install all lights, i.e. to connect them all with control receivers. Then, the commissioning phase is completed.

Figure 4B:
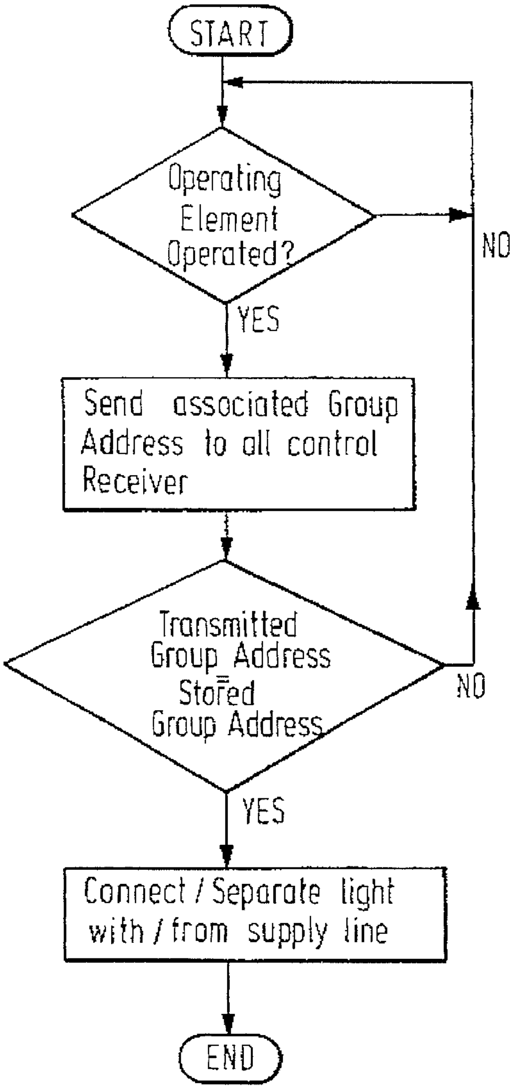
FIG. 4B a flow diagram for explanation of the process according to the invention during the operational phase.

There will be described below with reference to FIG. 4B the process in accordance with the invention for operating the control system following commissioning. First, it is detected by control transmitter 10 whether an operating element has been operated. If this is the case, the associated group address is generated and sent to all control receivers 40-1 to 42-2. Then, each individual control receiver 40-1 to 42-2 checks whether the transmitted group address corresponds to the stored group address. If this is not the case, the operating condition of the connected light remains unchanged. If, however, the received group address agrees with the stored group address, the light connected to the relevant control receiver is connected to the supply voltage, or disconnected, depending on the position of the operating element.

Along with the transmittal of group addresses, it is also possible to transmit further control signals in the form of function addresses which correspond to predetermined functional conditions of the connected consumer units, e.g. a particular brightness of a connected light. If the transmitted group address agrees with the stored group address of a control receiver, the relevant control receiver associates the likewise received function address with a particular functional state of the consumer unit connected thereto, and controls the connected consumer unit in such a manner that the functional state of the connected consumer unit alters to that state addressed by the received function address. For example, various function addresses can be allocated to different brightnesses of a lighting body and the control receiver controls the connected lighting body to a particular output power which corresponds to the selected brightness. Thereby, in the memory 61 of the control receiver, particular function addresses can be allocated to different output powers of the control circuit 62 in the form of a table.

Further, by means of its connection testing device 63, the control receiver can check continuously during the operational phase whether the consumer unit is still connected or if this unit is defective. If the consumer unit is no longer connected or is defective, the control circuit 62 can be switched off by way of the control unit 60, to avoid an overloading thereof. It can be provided that the group address stored in the memory 61 is erased when the connection between the consumer unit and the control circuit 62 is separated. Such an erasing procedure is necessary in order to carry out the installation anew, possibly with new group allocations. This procedure is, however, disadvantageous in that the complete installation procedure for commissioning a consumer unit group must be repeated when a particular consumer unit, e.g. as a consequence of a defect, must be changed, or when the group allocations are to be altered as a whole. It is therefore advantageous to provide special control commands in such a manner that the grouping of the control receivers can be altered without the need for separating the connection between the consumer units and the control receiver.

Figure 5:
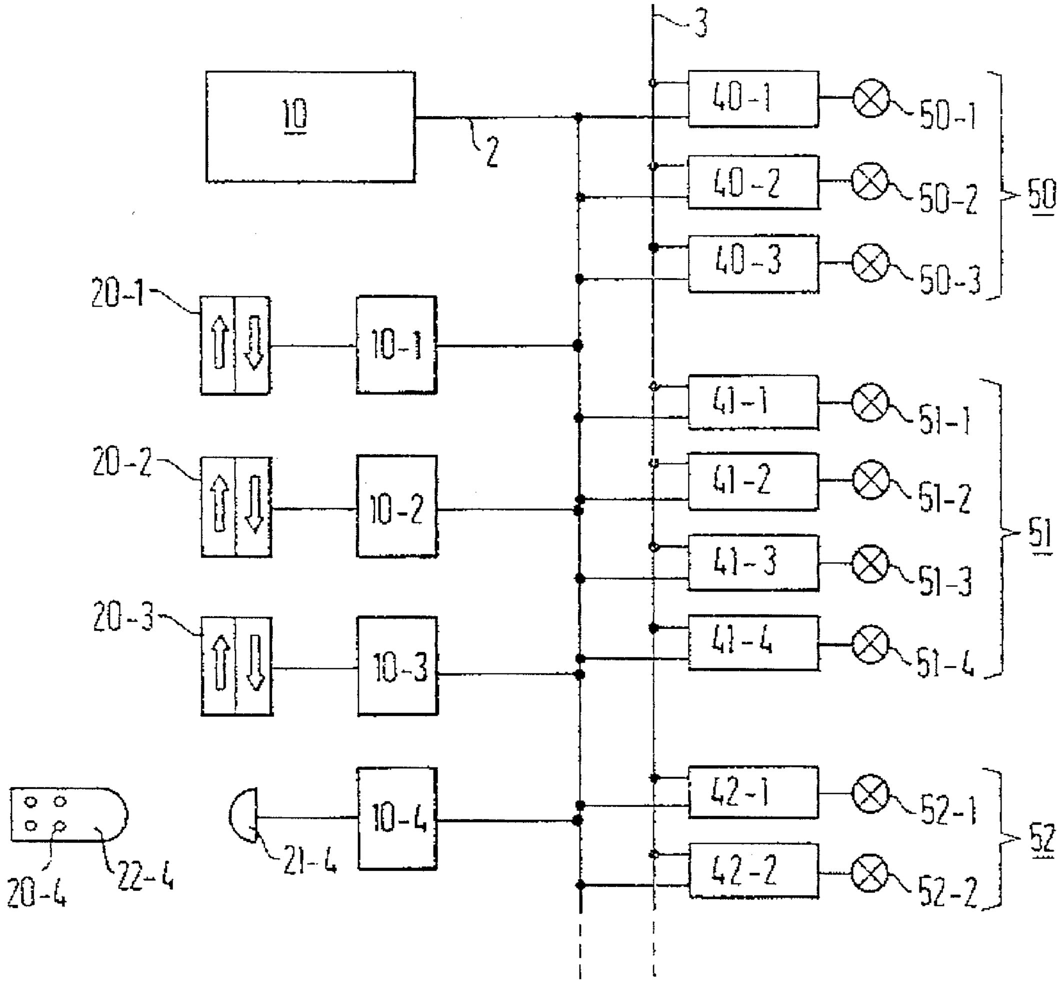
FIG. 5 a second exemplary embodiment of the control arrangement according to the invention.

In FIG. 5 there is shown a second exemplary embodiment of the control arrangement in accordance with the invention. The second exemplary embodiment differs from the first exemplary embodiment shown in FIG. 1 in that each operating element 20-1 to 20-4 is connected with the control line 2 via a decentral control transmitter 10-1 to 10-4 associated with the operating element. The control transmitters 10-1 to 10-4 work in the manner described above in relation to the central control transmitter 10 and serve in each case for the generation of the group address and, if applicable, the function addresses of the operating element connected thereto. The advantage of this arrangement is that there is no need for a separate connecting line 30-1 to 30-4 between each operating element 20-1 to 20-3 or sensor element 21-4 and the central control transmitter. The decentral control transmitter can be arranged in the immediate vicinity of the relevant operating element. Further, there may be additionally available e.g. in a control centre, a central control transmitter which can serve for central control and monitoring of the control arrangement by means of the input and output devices 13 and 14 as described with reference to FIG. 3.

I claim:

1. Process for controlling consumer units allocated to groups in dependence upon the operation of operating elements provided respectively for the consumer unit groups, characterised in that, during a commissioning phase for determining the allocation of the consumer units to the groups, the consumer units of a first consumer unit group are respectively connected with first control receivers, a first group address, which indicates the allocation of the first consumer unit group to a first operating element is stored in the first control receivers as a result of an operation of the first operating element, the consumer units of a second consumer unit group are respectively connected with second control receivers, a second group address, which indicates the allocation of the second consumer unit group to a second operating element, is stored in the second control receivers as a result of an operation of the second operating element, whilst the first group address stored in the first control receivers is retained, and in that during an operational phase operating one of said operating elements and transmitting a group address, which indicates said one operating element, to all said control receivers, and effecting the control of a consumer unit connected to a control receiver in which a stored group address corresponds with the transmitted group address.

2. Process according to claim 1, characterised in that, along with a group address, a function address is transmitted to the control receivers, which function address selects a particular function from amongst a plurality of specific functions of a consumer unit.

3. Process according to claim 2, characterised in that, along with the group address, a plurality of function addresses are stored in each control receiver, which function addresses represent the functions of the consumer unit connected to the control receiver, whereby when a received function address agrees with a stored function address, the connected consumer unit is placed in the corresponding functional condition.

4. Process according to claim 3, characterised in that, upon connection of a consumer unit to a control receiver the function addresses are stored in correspondence with the result of a procedure to be carried out by the control receiver for identification of the connected consumer unit.

5. Process according to claim 2, characterised in that, the group addresses and/or function addresses stored in the control receivers are erased upon separation of the connection between a consumer unit and a respective control receiver.

6. Process according to claim 1, characterised in that, the allocation of the consumer units to the groups is alterable during the operational phase, whereby a corresponding control command together with new group addresses is transmitted to the control receivers.

7. Control arrangement for controlling consumer units allocated to groups, having a plurality of operating elements each for controlling a consumer unit group to be associated therewith, at least one control transmitter, each operating element being connected with a control transmitter for sending signals thereto, which signals correspond to an operating function associated with the operating element or correspond to one of a plurality of operating functions associated with the operating element, a plurality of control receivers, to which consumer units can be connected, said control receivers each having a memory for storing group and/or function addresses, a connection test device for determining whether a consumer unit is connected to a control receiver, and a control circuit for controlling the connected consumer unit, and a control line which connects the control transmitter or control transmitters with the control receivers for the transmission of the group and/or function addresses, said control arrangement being characterised in that each operating element is connected with the control line via a central control transmitter.

8. Control arrangement according to claim 7, characterised in that, the operating elements are connected with a common central control transmitter.

9. Control arrangement according to claim 8, characterised in that, the central control transmitter has input and/or output devices for central control and/or monitoring of the connected consumer units.

10. Control arrangement according to claim 7, further characterised in that, the control transmitter or control transmitters includes a memory for intermediate storage of the operating functions selected by means of the operating elements.

11. Control arrangement according to claim 7, further characterised in that, at least the memories of the control receivers are non-volatile, erasable and re-writable memories.

12. Control arrangement according to claim 7, further characterised in that, the control line is simultaneously a common supply line for the control receivers and the control transmitter or control transmitters, and the group and/or function addresses are transmitted via the supply line.

13. Control arrangement according to claim 7, further characterised in that, the control line is an optical signal transmission line and the control transmitter or control transmitters comprise an optical emitter element and the control receiver comprises an optical sensor element.

14. Control arrangement according to claim 7, characterised in that, at least one of the operating elements is connected with the control transmitter by means of a remote control transmitter and a remote control receiver.

15. Control arrangement for controlling consumer units allocated to groups, having a plurality of operating elements each for controlling a consumer unit group to be associated therewith, at least one control transmitter, each operating element being connected with a control transmitter for sending signals thereto, which signals correspond to an operating function associated with the operating element or correspond to one of a plurality of operating functions associated with the operating element, a plurality of control receivers, to which consumer units can be connected, said control receivers each having a memory for storing group and/or function addresses, a connection test device for effecting a connection test for determining whether a consumer unit is connected to a control receiver, and a control circuit for controlling the connected consumer unit, and a control line which connects the control transmitter or control transmitters with the control receivers for the transmission of the group and/or function addresses, said control arrangement being characterised in that, the connection test device effects the connection test mechanically by probing a connection location for a consumer unit and/or a plug location for a cable connection with the consumer unit.

16. Control arrangement according to claim 15, characterised in that, the connection test device determines the nature of the connected consumer unit by detecting particular mechanical characteristic parameters of the consumer unit, and in that the comparison of a function address received from the control receiver is effected only with such function addresses stored in the memory as correspond to specific functions of the connected consumer unit.

17. Control arrangement for controlling consumer units allocated to groups, having a plurality of operating elements each for controlling a consumer unit group to be associated therewith, at least one control transmitter, each operating element being connected with a control transmitter for sending signals thereto, which signals correspond to an operating function associated with the operating element or correspond to one of a plurality of operating functions associated with the operating element, a plurality of control receivers, to which consumer units can be connected, said control receivers each having a memory for storing group and/or function addresses, a connection test device for effecting a connection test for determining whether a consumer unit is connected to a control receiver, and a control circuit for controlling the connected consumer unit, and a control line which connects the control transmitter or control transmitters with the control receivers for the transmission of the group and/or function addresses, said control arrangement being characterised in that, the connection test device effects the connection test electrically, by means of impedance measurement at the electrical connection device provided for the consumer unit.

18. Control arrangement according to claim 17, characterised in that, the connection test device determines the nature of the connected consumer unit by detecting particular electrical characteristic parameters of the consumer unit, and in that the comparison of a function address received from the control receiver is effected only with such function addresses stored in the memory as correspond to specific functions of the connected consumer unit.

19. Control arrangement for controlling consumer units allocated to groups, having a plurality of operating elements each for controlling a consumer unit group to be associated therewith, at least one control transmitter, each operating element being connected with a control transmitter for sending signals thereto, which signals correspond to an operating function associated with the operating element or correspond to one of a plurality of operating functions associated with the operating element, a plurality of control receivers, to which consumer units can be connected, said control receivers each having a memory for storing group and/or function addresses, a connection test device for effecting a connection test for determining whether a consumer unit is connected to a control receiver, and a control circuit for controlling the connected consumer unit, and a control line which connects the control transmitter or control transmitters with the control receivers for the transmission of the group and/or function addresses, said control arrangement being characterised in that, the control circuit has a power regulation part which allows a variation of the power take-up of the connected consumer unit.

20. Control arrangement according to claim 19, characterised in that, the control circuit has a controllable switch, which connects the connected consumer unit with a supply voltage when the group address received from the control receiver agrees with the stored group address.

* * * * *